US007320473B1

(12) United States Patent
Bennett

(10) Patent No.: US 7,320,473 B1
(45) Date of Patent: Jan. 22, 2008

(54) BRAKE APPARATUS FOR A WHEELCHAIR

(76) Inventor: John E. Bennett, 5905 Clint Pl., Rancho Palos Verdes, CA (US) 90275

( * ) Notice: Subject to any disclaimer, the term of this patent is extended or adjusted under 35 U.S.C. 154(b) by 0 days.

(21) Appl. No.: 11/690,980

(22) Filed: Mar. 26, 2007

(51) Int. Cl.
B60T 1/04 (2006.01)
(52) U.S. Cl. .................................. 280/304.1; 188/2 F
(58) Field of Classification Search ............ 280/304.1, 280/250.1, 33.994; 188/2 F
See application file for complete search history.

(56) References Cited

U.S. PATENT DOCUMENTS

| 2,859,837 | A | * | 11/1958 | Mize .......................... 188/2 F |
| 3,556,260 | A | * | 1/1971 | Meyer et al. .................. 188/74 |
| 4,691,933 | A | * | 9/1987 | Strauss ..................... 280/304.1 |
| 4,805,931 | A | * | 2/1989 | Slasor ......................... 280/650 |
| 6,315,085 | B1 | | 11/2001 | Dahlem |
| 6,431,572 | B1 | * | 8/2002 | Harden et al. ............ 280/250.1 |
| 6,443,268 | B1 | * | 9/2002 | Dearth et al. ................ 188/2 F |
| 6,578,860 | B1 | * | 6/2003 | Chang ...................... 280/250.1 |
| 6,655,503 | B1 | * | 12/2003 | Moody ........................ 188/2 F |
| 6,854,754 | B1 | * | 2/2005 | Easley, Jr. ............... 280/304.1 |
| 7,066,482 | B2 | * | 6/2006 | Ford ....................... 280/304.1 |
| 7,144,025 | B2 | * | 12/2006 | Wakita et al. ........... 280/250.1 |

* cited by examiner

Primary Examiner—Tony Winner
(74) Attorney, Agent, or Firm—Richard S. Erbe

(57) ABSTRACT

A brake apparatus for a wheelchair is mounted on one side of a wheelchair, with a corresponding brake apparatus mounted on the opposite side of a wheelchair. The brake apparatus includes an upper assembly mounted on the wheelchair frame just below the padded arm rest of the wheelchair. The upper assembly includes a brake lever and brake handle for locking and unlocking the wheels on each side. The upper assembly is connected to an adjustable strut, which connects to the lower assembly. The lower assembly includes a system of link arms that allows a brake arm having a brake shoe to lock and unlock the wheel on the wheelchair. The length of the strut may be adjusted and the position of the upper and lower assemblies may also be adjusted so that the brake assembly can be configured for operation on various sizes of wheelchairs.

11 Claims, 5 Drawing Sheets

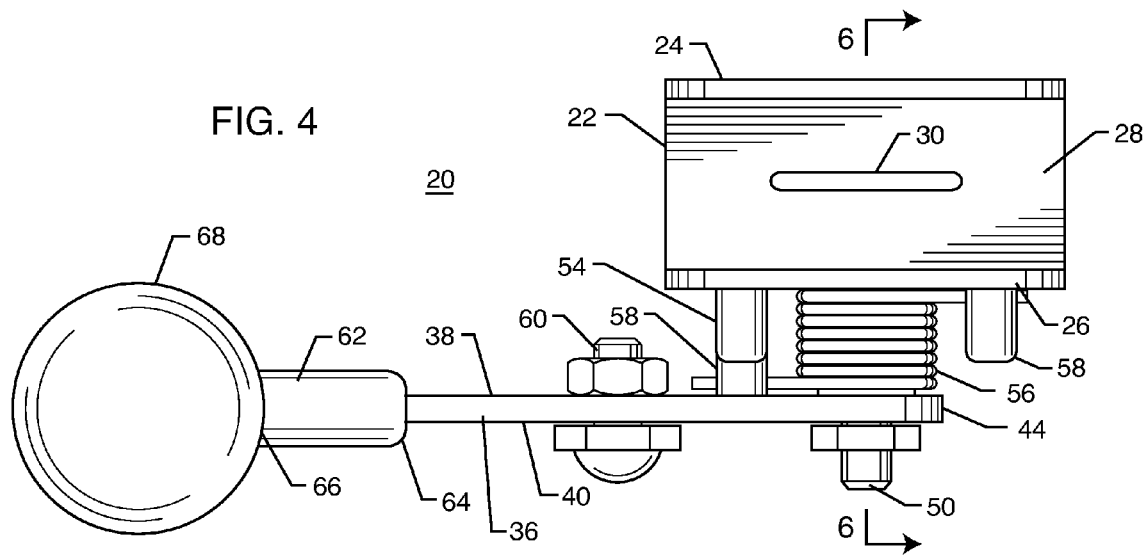
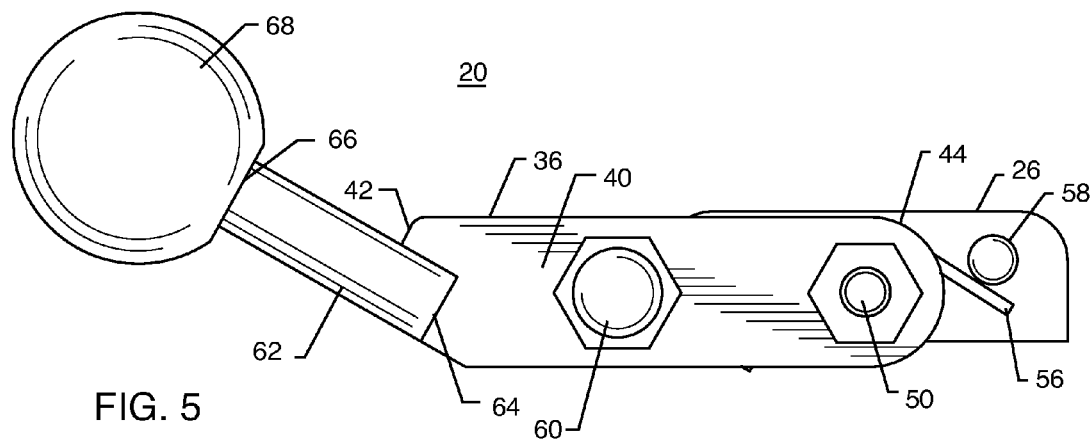
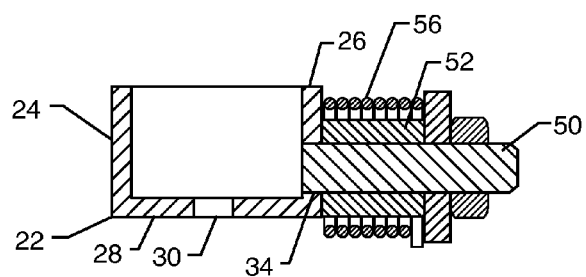

BRAKE APPARATUS FOR A WHEELCHAIR

RELATED APPLICATIONS

Not applicable.

BACKGROUND OF THE INVENTION

1. Field of the Invention

The present invention relates to the field of devices for the physically challenged, and, more specifically, the invention relates to an apparatus for effectively operating the brakes of a wheelchair which include brake handles that are located within easy reach and are highly visible to a wheelchair occupant or attendant.

2. General Background and State of the Art

Wheelchairs are typically provided with two hand-operated brakes, one near the left wheel and the other near the right wheel of a conventional wheelchair. In such wheelchairs, the brake operating handles are located very near the actual brake shoe, and are not readily visible to either the wheelchair occupant or the attendant and may be difficult for either of them to reach the brake operating handles. Both the left side and ride side brakes must be operated in order to place the wheelchair wheels in either an unlocked or locked condition.

A common problem associated with the use of a wheelchair is the danger that the occupant of the wheelchair may fall while either being seated in or exiting the wheelchair seat. During either of those events, both wheelchair brakes should be in the locked position. If they are not locked, the wheelchair could suddenly move, thus exposing the occupant to the risk of falling and being seriously injured.

For safety reasons, the wheelchair occupant or attendant must always remember to set the brakes to the locked position prior to the occupant being seated in or exiting the wheelchair seat. This vital precaution may be overlooked or neglected by the wheelchair occupant or the attendant because of a variety of reasons, such as forgetfulness due to the lack of visibility of the brake handles, or the reluctance or inability of either to reach and operate the brakes. The attendant is generally not able to operate both brakes from the same position, but rather must operate one and then change positions to operate the other. Many occupants of wheelchairs may be fragile and may lack the strength or visual acuity to operate the brakes.

Some proposed solutions to these problems are based on providing an apparatus for wheelchair brake operation where the brakes are set in the unlocked condition while the occupant is seated in the wheelchair, but lock automatically when the occupant begins to rise to exit the wheelchair and the apparatus detects that the occupant's weight is rising off of the wheelchair seat. Such an apparatus is generally complex and needs to be adjusted to suit the occupant's weight, providing another safety risk that must be addressed by the occupant and/or the attendant. Such an apparatus must be able to be adapted to a variety of users in situations where the wheelchair is used in a hospital, nursing home or hospice. Rental wheelchairs of such a design would also present this same issue.

Because the aforementioned type of wheelchairs, which depend on shifting of the weight of the occupant for operation, will remain locked when there is no occupant in the wheelchair, a means must be provided to release the brakes when the wheelchair is unoccupied so that the wheelchair may be easily moved, thus necessitating an additional mechanism to unlock the brakes. Such wheelchairs as these, with all of the additional mechanisms required for safe operation, may be difficult to fold and store.

Another attempt to resolve the problems of conventional wheelchairs is disclosed in U.S. Pat. No. 6,315,085 (Dahlem). Dahlem discloses a semiautomatic wheelchair brake application apparatus that depends on force applied by the forearms and hands of the wheelchair occupant when the occupant begins to rise from the wheelchair seat. Dahlem includes a left side and right side brake apparatus each having an actuator lever arm installed on the same level as and in conjunction with the wheelchair arm rest. The Dahlem actuator lever positions are described as "upwardly angled" to "parallel to the wheelchair arm," and from "essentially vertical" to "substantially horizontal." When the actuator lever arm is in an upward configuration in relation to the arm rest of the wheelchair, the ability of the occupant to rest his or her arm on the arm rest may be impeded and thus the occupant may be made uncomfortable. The brake apparatus disclosed in Dahlem is used in conjunction with the existing wheelchair brakes, and thus the required force for the user to operate the brakes may be substantial and difficult to estimate. Furthermore, the brake apparatus system disclosed in Dahlem will have a tendency for the brake shoe on the brake apparatus to drag on the wheel, thus wearing out the tires and likely requiring more force to propel the wheelchair due to the drag forces.

There thus exists a need for a brake apparatus for each side of a wheelchair that provides an easily visible and reachable brake handle that is easily operable by either the wheelchair occupant and/or the attendant. There also exists a need for a wheelchair brake apparatus that may be operated from a single position, may be operated independent of the weight of the occupant, does not interfere with the ability of the wheelchair occupant to rest his or her arms on the wheelchair arm rests, enables the wheelchair to be conveniently folded for storage, and also provides a means to limit the motion of the brake handle so that the wheelchair brake shoe does not rub on the wheel.

SUMMARY OF THE INVENTION

It is therefore an object of the present invention to provide a brake apparatus for a wheelchair that includes a brake handle that is located in an easily visible and accessible location.

It is another object of the present invention to provide a brake apparatus for a wheelchair that may be operated by the occupant of the wheelchair or the attendant from a single position.

It is a further object of the present invention to provide a brake apparatus for a wheelchair that enables easy folding or storing of the wheelchair.

Yet another object of the present invention is to provide a brake apparatus for a wheelchair that is not dependent on the weight of the wheelchair occupant for operation.

Another object of the present invention is to provide a brake apparatus for a wheelchair that is not dependent on the force applied by the occupant to the wheelchair arm rests when the occupant is rising from the chair.

Still another object of the present invention is to provide a brake apparatus for a wheelchair that will not interfere with the ability of the wheelchair occupant to rest his or her arms on the arm rests of the wheelchair.

It is yet another object of the present invention to provide a brake apparatus for a wheelchair that may be easily retrofitted and adapted to an existing wheelchair.

A further object of the present invention is to provide a brake apparatus for a wheelchair that may be provided as original equipment with a wheelchair.

Another object of the present invention is to provide a brake apparatus for a wheelchair that provides a means of biasing the brake shoes in a position so that they are not constantly rubbing on the wheels while the wheelchair is in motion.

These and other objectives are achieved by the present invention, which, in a broad aspect, provides a wheelchair brake apparatus having a brake operating handle that is located in a convenient location and does not depend on the weight of the wheelchair occupant for operation. It should be understood that while the subsequent description and drawings disclose the structural and functional features of a wheelchair brake apparatus that is located on the left hand side of the wheelchair (relative to an occupant seated in the wheelchair), a corresponding wheelchair apparatus is mounted on the right side of the wheelchair, thus enabling the braking of both the right and left side wheels.

A wheelchair brake apparatus according to a preferred embodiment of the present invention includes three main components, which are the upper assembly, the lower assembly, and an adjustable strut operatively connecting the upper and lower assemblies.

As mentioned previously, the following description discloses the structural and functional features of a wheelchair brake apparatus mounted on the left side of a wheelchair. The wheelchair generally includes a front, rear, left side, right side, a pair of wheels (one on each side), a pair of arm padded arm rests, all of which are connected together by a frame.

The upper assembly of the wheelchair brake apparatus is attached to an upper tubular frame member adjacent to and slightly below the padded arm rest by means of a mounting channel. The mounting channel includes a slot so that the upper assembly may be positioned on the frame member for optimal operation of the wheelchair brake apparatus and enables the present invention to be adapted for use with a variety of wheelchairs. The upper assembly includes a brake lever pivotably attached to the mounting channel. A biasing torsion spring, in conjunction with a pair of spring pins and a stop, limits movement of the brake lever and provides a biasing means to bias the wheelchair brake apparatus so that the brake shoe (discussed later) only contacts the wheel of the wheelchair when the brake is in the locked position.

At one end of the brake lever is attached a brake handle having a gripping knob. Preferably, the gripping knob is spherical in shape, making it easy to handle. The gripping knob is located conveniently so that the wheelchair occupant need not move his or her hand and arm very far from a position of rest on the padded arm rests to grasp the gripping knob. A movement of the gripping knob downwards will cause the wheelchair brake apparatus to move to the stopped position. Moving the gripping knob upwards from the locked position will move the wheelchair brake apparatus to the unlocked position. In the unlocked position, tension provided by the torsion spring biases the wheelchair brake apparatus to the unlocked position, so that the brake shoe does not rub against the wheel.

An adjustable strut is connected to the brake lever by means of fasteners and operably connects the upper assembly to the lower assembly, which will be described shortly. The strut according to a preferred embodiment of a wheelchair brake apparatus of the present invention has its upper end attached to the upper assembly, and its lower end attached to the lower assembly. The strut is constructed of two separate portions, a first portion and a second portion, with the first portion connected to the upper assembly, and the second portion connected to the lower assembly. One end of the first portion has a threaded section, which is threaded into a threaded receiving collar in one end of the second portion. The length of the strut may thus be adjusted to provide optimal operation and allows the wheelchair brake apparatus of the present invention to be adjusted for use with a variety of wheelchair shapes and sizes.

The lower end of the adjustable strut connects to the lower assembly. The lower assembly is mounted to a lower tubular member of the wheelchair by means of a mounting channel, which contains a slot so that the lower assembly and the brake shoe may be positioned to provide optimal operation of the wheelchair brake apparatus.

The lower assembly includes a linkage that connects to the lower end of the strut. The linkage consists of an angled pivot arm pivotably attached to both the mounting channel and a link arm that connects to a brake arm. The first end of the brake arm is pivotably attached to the mounting channel and includes a brake shoe at its second end for contacting the wheel of the wheelchair, thus locking the wheel and inhibiting rotation of the wheel.

To operate the wheelchair brake apparatus and place a wheel in the locked position, the wheelchair occupant or the attendant grasps the gripping knob at the end of the brake handle and pushes it downwards. This pushing action causes the brake lever to pivot forward and downward. The pivoting of the brake lever is transmitted to the strut and thence to the angled pivot arm of the lower assembly. The angled pivot arm rotates counterclockwise (as viewed from the left side of the wheelchair) and causes the link arm to rotate clockwise (again as viewed from the left side of the wheelchair). The rotation of the link arm causes the brake arm to rotate counterclockwise (as viewed from the left side of the wheelchair) until the brake shoe contacts the wheel, placing the wheel in a locked position.

Movement of the wheelchair brake assembly on the right side of the wheelchair would be identical to that just described, except that those corresponding components rotating clockwise on the left side would move counterclockwise on the right side, and visa versa.

To move the wheelchair brake apparatus to the unlocked position from the locked position, the occupant or the attendant grasps the gripping knob on the brake lever and the movements just described are reversed. In the unlocked position, the torsion spring biases the brake shoe to the unlocked position and prevents unwanted rubbing of the brake shoe against the wheel.

Further objects and advantages of this invention will become more apparent from the following description of the preferred embodiment, which, taken in conjunction with the accompanying drawings, will illustrate, by way of example, the principles of the invention.

BRIEF DESCRIPTION OF THE DRAWINGS

The foregoing and other aspects and advantages will be better understood from the following detailed description of the preferred embodiments of the invention with reference to the drawings in which:

FIG. 4 illustrates a plan view of the upper assembly of a preferred embodiment of a wheelchair brake apparatus according to the present invention;

FIG. 5 illustrates a front elevation view of the upper assembly of a preferred embodiment of a wheelchair brake apparatus according to the present invention;

FIG. 6 is a sectional view taken at line 6-6 of FIG. 4;

DETAILED DESCRIPTION OF THE PREFERRED EMBODIMENT OF THE INVENTION

In the following description of the invention, reference is made to the accompanying drawings, which form a part thereof, and in which are shown, by way of illustration, an exemplary embodiment illustrating the principles of the wheelchair brake apparatus of the present invention and how it may be practiced. It is to be understood that other embodiments may be utilized to practice the present invention and structural and functional changes may be made thereto without departing from the scope of the present invention.

Figure 1:
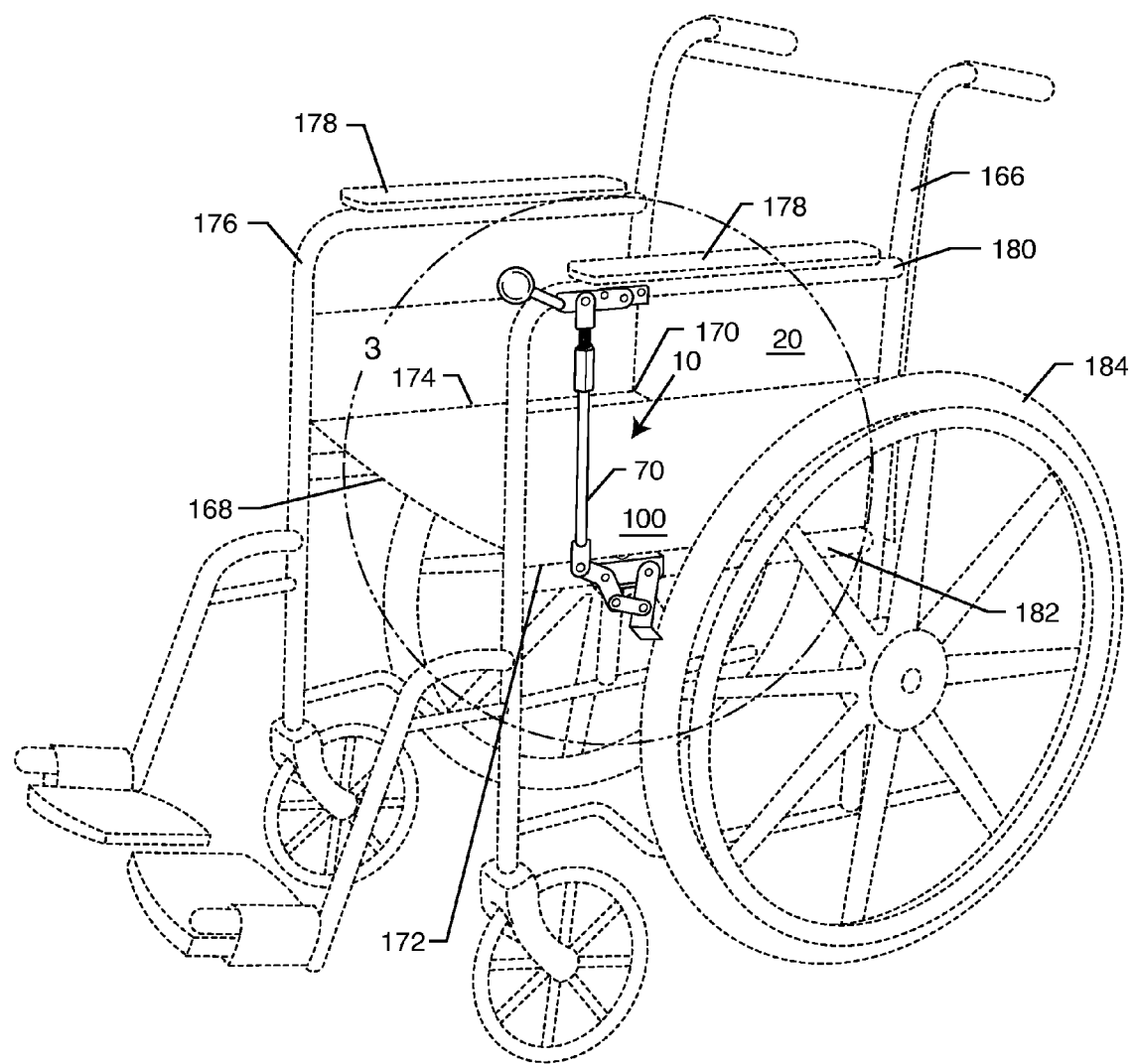
FIG. 1 illustrates a perspective view of a preferred embodiment of a wheelchair brake apparatus according to the present invention.
Figure 2:
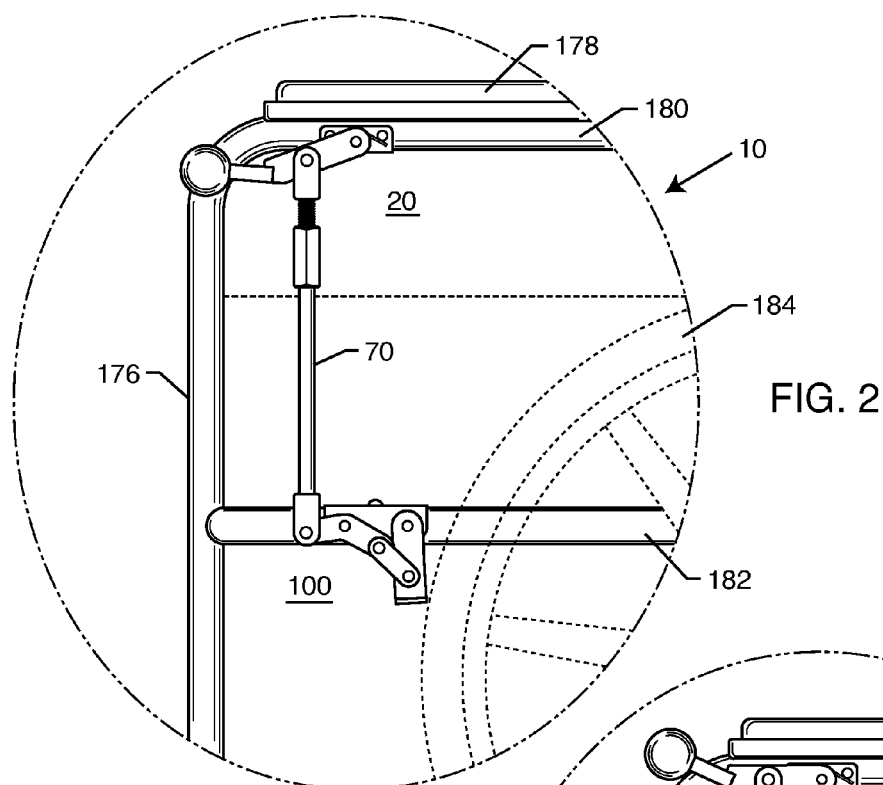
FIG. 2 illustrates a view of the left hand side of a wheelchair showing a preferred embodiment of a wheelchair brake apparatus according to the present invention with the brake in the locked position.
Figure 3:
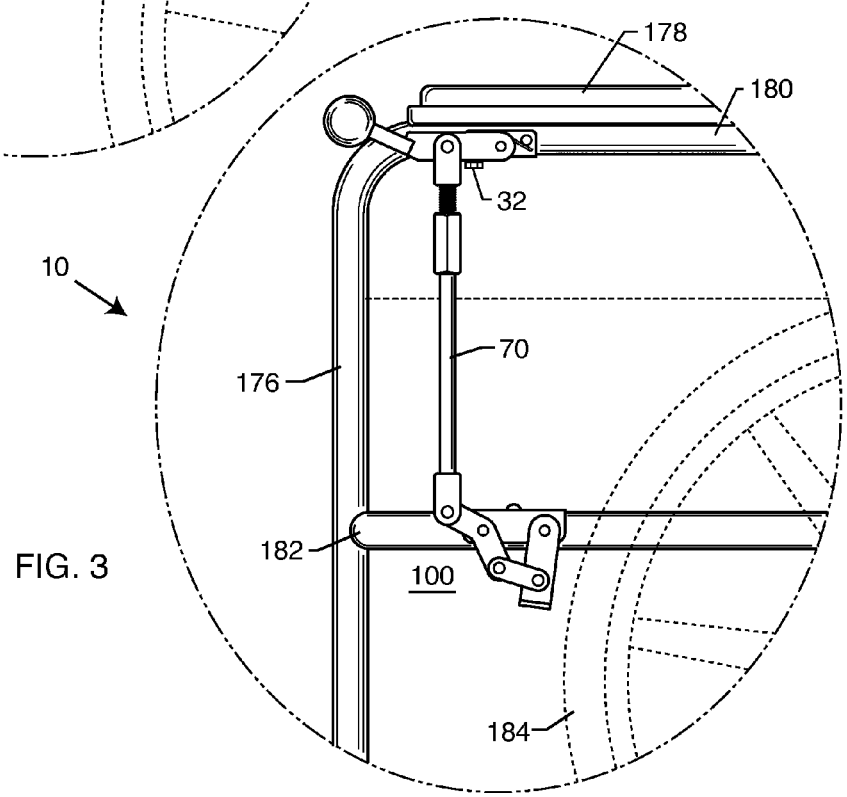
FIG. 3 illustrates a view of the left hand side of a wheelchair showing a preferred embodiment of a wheelchair brake apparatus according to the present invention with the brake in the unlocked position.

A wheelchair brake apparatus according to the present invention is indicated by the numeral 10 and is illustrated in FIGS. 1-3. FIG. 1 illustrates a perspective view of a brake apparatus 10 mounted on one side of a wheelchair 166. Wheelchair 166 includes a front 168, rear 170, left side 172, and right side 174. While the drawing figures and the specification are largely drawn to a wheelchair brake apparatus 10 mounted on left side 172, it should be apparent that a corresponding brake apparatus will be mounted on right side 174 for safe operation of wheelchair 166, and that the disclosure herein applies to the structure and function of a brake apparatus 10 mounted on right side 174, as well as on left side 17. Wheelchair 166 also includes a frame 176, which includes (on each side) upper tubular frame member 180 and lower tubular frame member 182. Wheelchair 166 also includes (on each side) a padded arm rest 178 and a wheel 184.

FIGS. 2 and 3 illustrate the overall construction of brake apparatus 10, which generally includes upper assembly 20, lower assembly 100, and adjustable strut 70, which operably connects the upper and lower assemblies 20 and 100. FIG. 2 shows brake apparatus 10 on left side 172 with the brake shoe 162 in contact with wheel 184, placing brake apparatus 10 in the locked position. FIG. 3 shows brake apparatus 10 in its normal, unlocked position, with brake shoe 162 moved away from contacting wheel 184, allowing free movement of wheelchair 166.

Upper assembly 20 of brake apparatus 10 is illustrated in FIGS. 4-6. Mounting channel 22 is connected to upper tubular frame member 180 by means of fastener 32. Mounting channel 22 includes inner side wall 24 and outer side wall 26, and lower connecting wall 28 connecting the side walls 24 and 26. Lower connecting wall 28 includes a slot 30 to allow fastener 32 to be extended through mounting channel 22 and connect to upper tubular frame member 180. Mounting channel 22 is fastened by means of fastener 32 through slot 30 and an opening (not shown) in upper tubular frame member 180. The inclusion of slot 30 allows the position of upper assembly 20 to be moved forwards and backwards along upper tubular member 180 to position and secure upper assembly 20 for optimal operation of the wheelchair. This construction is especially useful to adapt brake apparatus 10 to a variety of sizes of wheelchairs and is also quite useful for retrofitting brake apparatus 10 to wheelchairs.

Upper assembly 20 includes brake lever 36 attached to outer side wall 26. Brake lever 36 includes inner surface 38, outer surface 40, forward end 42, and rearward end 44. Brake lever 36 also includes a pair of openings (not shown). Brake lever 36 is pivotably attached to outer side wall 26 by means of pivot pin 50 extending through one opening in brake lever 36 and opening 34 in outer side wall 26. Pivot pin 50 extends through sleeve 52 between brake lever 36 and outer side wall 26.

The range of rotational movement of brake lever 36 is controlled by means of torsion spring 56 and a pair of spring pins 58 acting in conjunction with stop 54. Spring 56 surrounds pivot pin 50 and its movement is controlled by spring pins 58. Spring 56 is mounted between the inner surface 38 of brake lever 36 and outer side wall 26. One spring pin 58 is mounted on outer side wall 26, while the other spring pin 58 is mounted on the inner surface 38 of brake lever 36. Stop 54 is mounted on outer side wall 26 and disposed so that when brake lever 36 rotates upward (clockwise when viewed from the left side of wheelchair 166) to unlock the brake apparatus 10, the spring pin 58 mounted on brake lever 36 will contact stop 54 and thus limit the movement of brake lever 36. The force provided by spring 56 and spring pins 58 biases brake apparatus 10 to a normally unlocked position, to reduce the possibility of brake shoe 162 rubbing against wheel 184.

At forward end 42 of brake lever 36 is located brake handle 62 having a first end 64, the point at which brake lever 36 attaches to brake handle 62, and a second end 66. Attached to second end 66 is gripping knob 68, which the occupant of wheelchair 166 or the attendant grasps in order to operate brake apparatus 10. The operation of brake apparatus 10 will be described later in this specification. The location of gripping knob 68 is in a location that is highly visible, unlike prior art hand levers, and is also within easy reach of an attendant or reachable by the occupant of wheelchair 166 who is resting his or her arms on padded arm rest 178. The location of gripping knob 68 is near and below the padded arm rest 178 so that the occupant can have easy access to operate brake apparatus 10 while not interfering with the person's arms and hands resting on padded arm rest 178. The high visibility and access aspects of the brake apparatus 10 of the present invention provide distinctive advantages over prior known brakes for wheelchairs. The inventor has found that a spherically-shaped gripping knob 68 works well in conjunction with the brake apparatus of the present invention, although those skilled in the art will understand that other configurations of gripping knob may be used without departing from the scope of the invention.

Figure 7:
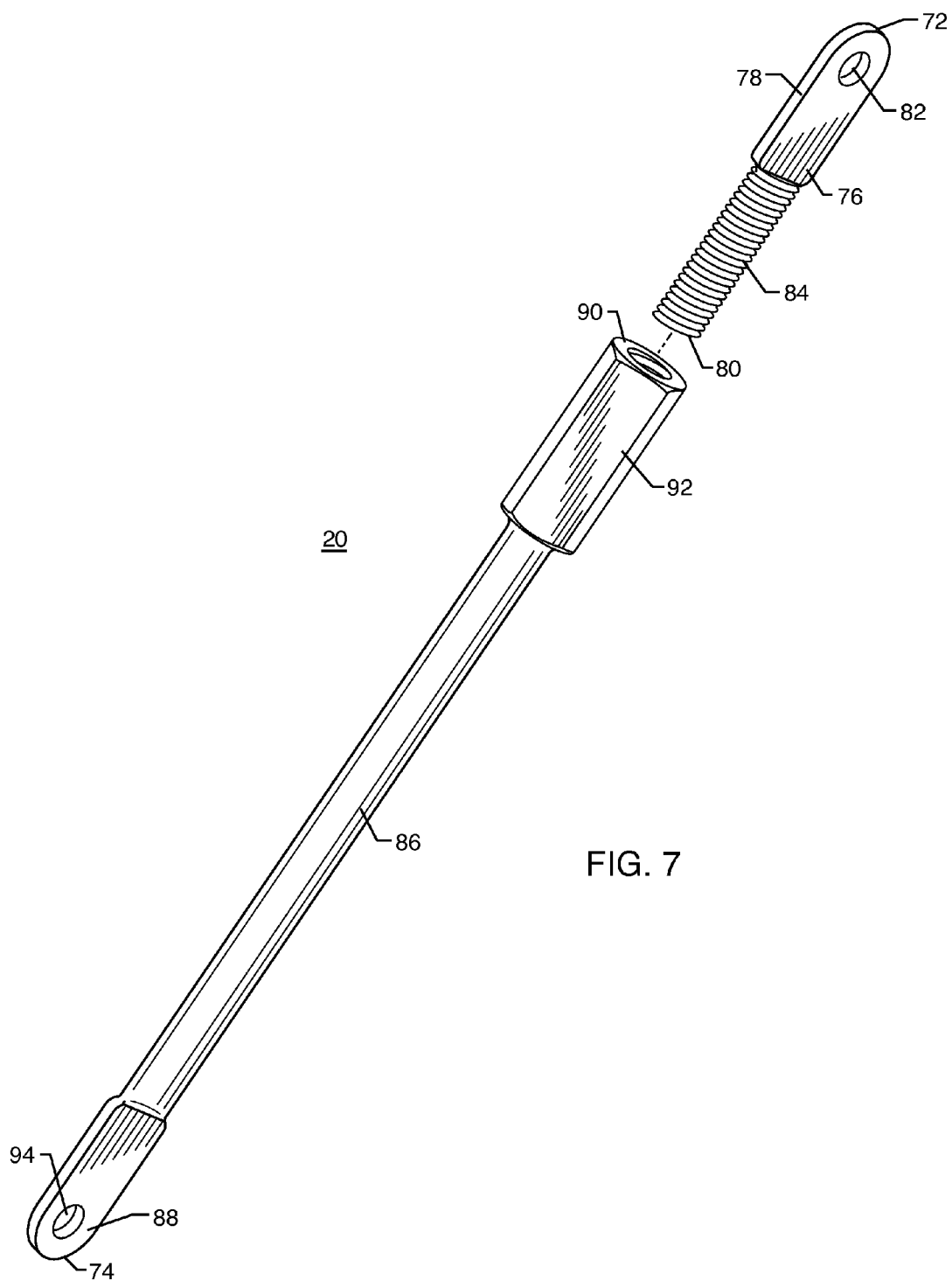
FIG. 7 illustrates an exploded view of the strut of a preferred embodiment of a wheelchair brake apparatus according to the present invention.

A brake apparatus 10 in accordance with the preferred embodiment of the invention also includes a strut 70 operably connecting upper assembly 20 and lower assembly 100. FIGS. 1-3 illustrate the configuration of strut 70 in relation to upper assembly 20 and lower assembly 100, while FIG. 7 illustrates an exploded view of strut 70. Strut 70 includes upper end 72, which connects to upper assembly 20, and lower end 74, which connects to lower assembly 100. Upper end 72 is connected to upper assembly 20 by means of connecting pin 60 extending through an opening (not shown) in brake lever 36 and opening 82 in strut 70. A second strut connecting pin 96 connects strut 70 to lower assembly 100 through openings 94 and an opening (not shown) in angled pivot arm 120.

Strut 70 is constructed of two separable and connectable portions, first portion 76 having first end 78 and second end 80, and second portion 86 having first end 88 and second end 90. Second end 80 of first portion 76 includes threaded section 84, which may be received by and threaded into threaded receiving collar 92 located at second end 90 of second portion 86. The threaded connection of the two portions of strut 70 allow the length of strut 70 to be adjusted to accommodate various sizes of wheelchairs by moving threaded section 84 within threaded receiving collar 92, which is particularly important for retrofitting brake apparatus 10 on existing wheelchairs, and to optimize performance of brake apparatus 10.

Figure 8:
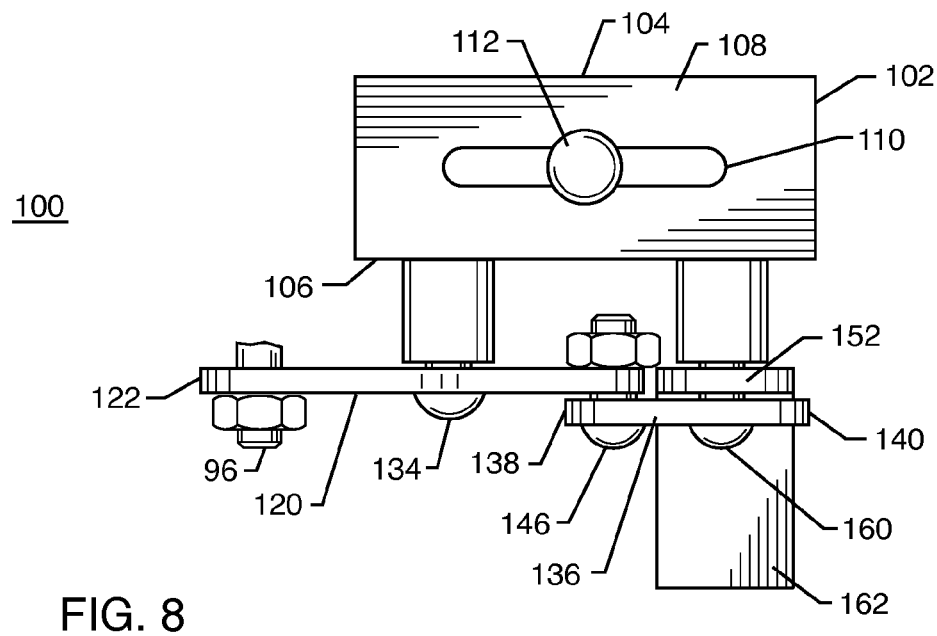
FIG. 8 illustrates a plan view of the lower assembly of a preferred embodiment of a wheelchair brake apparatus according to the present invention.
Figure 9:
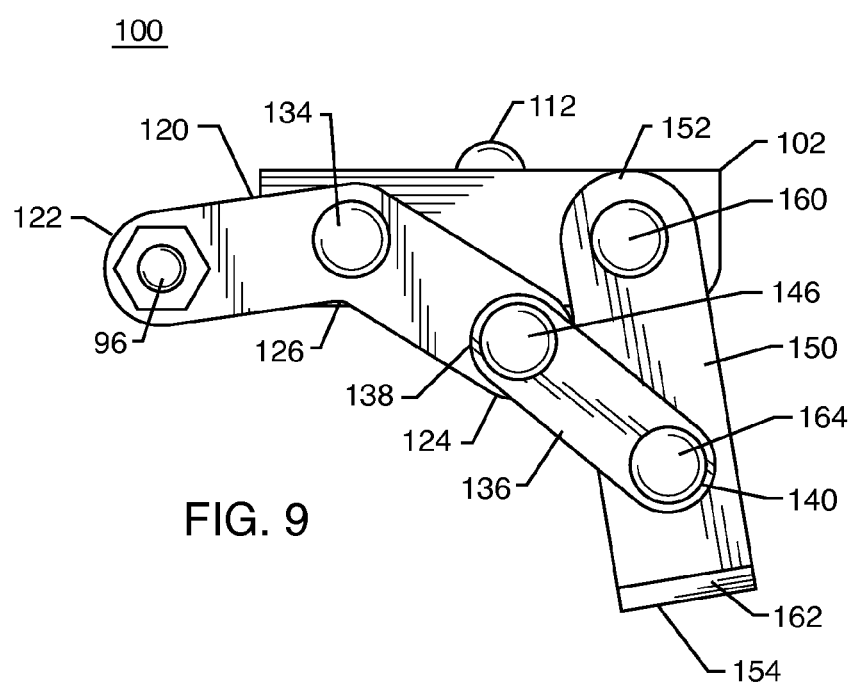
FIG. 9 illustrates a front elevation view of the lower assembly of a preferred embodiment of a wheelchair brake apparatus according to the present invention.

FIGS. 8 and 9 illustrate the construction of lower assembly 100 of the preferred embodiment of brake apparatus 10. Lower assembly 100 includes a linkage system formed by angled pivot arm 120, link arm 136, and brake arm 150. Brake arm 150 has a first end 152 and a second end 154 at which is located brake shoe 162, which engages wheel 184 when brake apparatus 10 is in the locked position.

Lower assembly 100 includes mounting channel 102, which is fastened by fastener 112 to lower tubular frame member 182. Mounting channel 102 includes inner side wall 104, outer side wall 106, and upper connecting wall 108 connecting side walls 102 and 104. Slot 110 in upper connecting wall 108 allows mounting channel 102 to be fastened by means of fastener 112 through slot 110 and an opening (not shown) in lower tubular frame member 182. The configuration of slot 110 allows the position of lower assembly 100 to be moved forwards and backwards along the lower tubular frame member 182 to position lower assembly 100 for optimal operation. This construction is especially useful to adapt brake apparatus 10 to a variety of sizes of wheelchairs and is also quite useful for retrofitting brake apparatus 10 to wheelchairs.

Brake arm 150 is pivotably connected by pivot pin 160 extending through opening 156 in brake arm 150 and an opening (not shown) in the outer side wall, so that brake shoe 162 may be rotated from a locked to an unlocked position and visa versa.

Brake arm 150 is caused to be moved by rotation of link arm 136. Link arm 136 has a first end 138 and a second end 140. Second end 140 of link arm 136 is connected to brake arm 150 by a connecting pin 164 extending through an opening (not shown) in link arm 136 and an opening (not shown) in brake arm 150.

An opening (not shown) at the first end 138 of link arm 136 provides a pivotable connection between link arm 136 and an opening (not shown) in angled pivot arm 120 by means of pivot pin 146, which connects link arm 136 to angled pivot arm 120 at second end 124 of angled pivot arm 120. Angled pivot arm 120 is constructed with an angle 126 between first end 122 and second end 124 to facilitate rotation of link arm 136 from the rotation of angled pivot arm 120. An opening (not shown) in angled pivot arm 120 and an opening (not shown) in outer side wall 106 provide a pivotable connection between angled pivot arm 120 and outer side wall 106 by means of pivot pin 134 extending through the two openings.

An opening (not shown) in first end 122 of angled pivot arm 120 provides a connection point with strut 70, thus operably connecting upper assembly 20 with lower assembly 100. Opening 94 in the lower end 74 of strut 70 is the other connecting point. Connecting pin 96 extending through opening 94 and the opening (not shown) in first end 122 of angled pivot arm 120 completes the connection of strut 70 to lower assembly 100.

Operation of brake apparatus 10 will now be described. In its normal (unlocked position), wheel chair 166 is free to move. To lock a wheel 184 on left side 172, the attendant or occupant grasps gripping knob 68, which is located a short distance in front of and just below the level of padded arm rest 178. The attendant or occupant pushes the gripping knob 68 downward; this movement causes brake lever 36 to pivot in a counterclockwise direction when viewed from the left side 172 of wheelchair 166, or in a clockwise direction when viewed from the right side 174. The rotational movement of brake lever 36 causes strut 70 to move and exert a force on angled pivot arm 120 and cause angled pivot arm 120 to rotate in a counterclockwise direction when viewed from the left side 172, or in a clockwise direction when viewed from the right side 174.

The rotation of angled pivot arm 120 exerts a force that causes link arm 136 to rotate in a clockwise direction when viewed from left side 172, or in a counterclockwise direction when viewed from right side 174. The rotation of link arm 136 exerts a force that causes brake arm 150 to rotate in a counterclockwise direction when viewed from left side 172, or in a clockwise direction when viewed from right side 174. The rotation of brake arm 150 causes brake shoe 162 to engage wheel 184 and lock it to prevent movement of wheel 184.

Unlocking brake apparatus 10 is achieved by grasping gripping knob 68 and pulling it upwards, causing the reverse of the rotations described in the preceding locking procedure discussion. The force applied by spring 58 in conjunction with spring pins 56 biases the wheelchair apparatus to the unlocked position.

The foregoing description of an exemplary embodiment of the present invention has been presented for purposes of enablement, illustration, and description. It is not intended to be exhaustive of or to limit the present invention to the precise forms discussed. There may be, however, other configurations of wheelchair brakes not specifically described herein, but with which the present invention is applicable. The present invention should therefore not be seen as limited to the particular embodiment described herein; rather, it should be understood that the present invention has wide applicability with respect to wheelchair brakes. Such other configurations can be achieved by those skilled in the art in view of the description herein. Accordingly, the scope of the invention is defined by the following claims.

What is claimed is:

1. A hand-operated brake apparatus for a wheelchair having wheels and a frame, said frame having a generally horizontal upper tubular frame member and a generally horizontal lower tubular frame member on each side of the wheelchair, said upper tubular member disposed below and adjacent a padded arm rest, said lower tubular frame member disposed adjacent a wheel, the apparatus comprising:
- an upper assembly connected to said upper tubular member, said upper assembly positioned to operate below the padded arm rest;
- a lower assembly connected to said lower tubular member, said lower assembly configured to engage said wheel for braking; and
- a strut having an upper end and a lower end, said first end and said second end each having a single opening, said strut connected at said upper end to said upper assembly, said strut connected at said lower end to said lower assembly.

2. The apparatus according to claim 1, wherein said strut further comprises:
- a first separable and connectable portion having a first end and a second end, said second end including a threaded section; and
- a second separable and connectable portion having a first end and a second end, said first end having a threaded receiving collar to engage said threaded section,
- whereby, the strut may be adjusted in length by the movement of the threaded section within the threaded receiving collar when said threaded section and said threaded receiving collar are disposed between said upper end and said lower end.

3. The apparatus according to claim 1, wherein upper assembly further comprises:
- a mounting channel attached to said upper tubular frame member, said mounting channel having an inner side wall, an outer side wall, and a lower connecting wall between the inner side wall and the outer side wall;
- a brake lever pivotably connected to said outer side wall by a pivot pin extending between said brake lever and said mounting channel, said brake lever having an inner surface, an outer surface, a forward end and a rearward end; and
- a brake handle having a first end and a second end, said brake handle connected at said first end to said forward end of the brake lever.

4. The apparatus according to claim 3, further including a gripping knob attached to the second end of the brake handle.

5. The apparatus according to claim 3, further including a torsion spring mounted between said outer side wall of the mounting channel and the inner surface of the brake lever, said torsion spring encircling said pivot pin.

6. The apparatus according to claim 5, further comprising a pair of spring pins to control the expansion and contraction of the torsion spring, one spring pin mounted on the outer side wall of the mounting channel, the other spring pin mounted on the inner surface of the brake lever.

7. The apparatus according to claim 6, further including a stop mounted on said outer side wall of said mounting channel,
- whereby, rotation of the brake lever is limited by the contact between the stop and the spring pin located on the inner surface of the brake lever.

8. The apparatus according to claim 7, wherein the torsion spring, spring pins and stop bias the brake apparatus to a brake off position.

9. The apparatus according to claim 3, wherein said lower connecting wall includes a slot for slidably adjusting the position of said mounting channel along said upper tubular frame member.

10. The apparatus according to claim 1, wherein said lower assembly further comprises:
- a mounting channel attached to said lower tubular frame member, said mounting channel having an inner side wall, an outer side wall, and an upper connecting wall between said inner side wall and said outer side wall;
- a brake arm having a first end and a second end pivotably connected to said mounting channel at said first end, said brake arm further having a brake shoe at said second end;
- a link arm having a first end and a second end connected to said brake arm at said second end of said link arm; and
- a pivot arm having a first end, a second end, and an angle, said pivot arm pivotably connected to said link arm at said second end of said pivot arm, said pivot arm pivotably connected to said outer side wall at said angle.

11. The apparatus according to claim 10, wherein said connecting wall further includes a slot for slidably adjusting the position of said mounting channel along said lower tubular frame member.

* * * * *